United States Patent
Engel et al.

(10) Patent No.: US 9,898,354 B2
(45) Date of Patent: Feb. 20, 2018

(54) OPERATING SYSTEM LAYERING

(71) Applicant: Microsoft Technology Licensing, LLC, Redmond, WA (US)

(72) Inventors: Jeffrey M. Engel, Bellevue, WA (US); Frederick J. Smith, Redmond, WA (US); Hari R. Pulapaka, Redmond, WA (US); Benjamin M. Schultz, Bellevue, WA (US); Mehmet Iyigun, Kirkland, WA (US); John Richardson, Coupeville, WA (US); Taylor Stark, Ottawa (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/076,277

(22) Filed: Mar. 21, 2016

(65) Prior Publication Data
US 2017/0269978 A1 Sep. 21, 2017

(51) Int. Cl.
*G06F 3/00* (2006.01)
*G06F 9/54* (2006.01)
(Continued)

(52) U.S. Cl.
CPC ............... *G06F 9/541* (2013.01); *G06F 8/65* (2013.01); *G06F 9/445* (2013.01);
(Continued)

(58) Field of Classification Search
CPC .................................................. G06F 9/541
(Continued)

(56) References Cited

U.S. PATENT DOCUMENTS 6,950,964 B1 * 9/2005 McMichael ........... G06F 11/004
714/38.13
7,028,158 B1 4/2006 Beatty et al.
(Continued)

FOREIGN PATENT DOCUMENTS

| EP | 1845444 A1 | 10/2007 |
| WO | 2010125473 A1 | 11/2010 |
| WO | 2015088374 A1 | 6/2015 |

OTHER PUBLICATIONS

Donal E. Porter, Rethingking the Library OS from the Top Down, 2011.*
(Continued)

*Primary Examiner* — Lechi Truong
(74) *Attorney, Agent, or Firm* — International IP Law Group, PLLC

(57) ABSTRACT

Techniques for implementing operating system layering are described herein. In one example, a method includes managing one or more container temporary storage spaces and one or more container runtime environments. Furthermore, the method includes loading, one or more drivers to provide compatibility between a container operating system and a host operating system, the one or more drivers comprising application program interface (API) compatibility libraries to enable API compatibility between the container operating system and the host operating system; metadata arbitration logic to enable compatibility between the container operating system and the host operating system by modifying container operating system references; and file arbitration logic to modify operating system file locations accessed by the container operating system and the host operating system.

19 Claims, 6 Drawing Sheets

(51) Int. Cl.
*G06F 9/445* (2018.01)
*G06F 9/455* (2018.01)

(52) U.S. Cl.
CPC ...... *G06F 9/44536* (2013.01); *G06F 9/45558* (2013.01); *G06F 2009/45579* (2013.01)

(58) Field of Classification Search
USPC ........................................................ 719/328
See application file for complete search history.

(56) References Cited

U.S. PATENT DOCUMENTS

| | | | |
|---|---|---|---|
| 8,903,705 | B2 | 12/2014 | Douceur et al. |
| 9,256,467 | B1 | 2/2016 | Singh et al. |
| 2004/0181579 | A1* | 9/2004 | Huck .................... G06Q 10/10 709/205 |
| 2005/0192984 | A1 | 9/2005 | Shenfield et al. |
| 2005/0198010 | A1* | 9/2005 | Borthakur ......... G06F 17/30067 |
| 2005/0246723 | A1* | 11/2005 | Bhesania .............. G06F 9/4411 719/321 |
| 2006/0010433 | A1 | 1/2006 | Neil |
| 2008/0046708 | A1* | 2/2008 | Fitzgerald ................ G06F 8/63 713/2 |
| 2008/0154985 | A1* | 6/2008 | Childs .................. G06F 3/0607 |
| 2010/0043072 | A1* | 2/2010 | Rothwell ............. G06F 21/566 726/24 |
| 2012/0005256 | A1 | 1/2012 | Cherukuri et al. |
| 2012/0180039 | A1 | 7/2012 | Bravery et al. |
| 2013/0057934 | A1* | 3/2013 | Satomi ................. G11B 27/034 358/537 |
| 2014/0095821 | A1 | 4/2014 | Yang et al. |
| 2014/0136865 | A1 | 5/2014 | Banerjee et al. |

OTHER PUBLICATIONS

Hall, Susan, "Rise of the Container-Focused Operating Systems", Retrieved on: Mar. 10, 2016 Available at: http://thenewstack.io/docker-fuels-rethinking-operating-system/.

Soltesz, et al., "Container-based Operating System Virtualization: A Scalable, High-performance Alternative to Hypervisors", In Proceedings of the 2nd ACM SIGOPS/EuroSys European Conference on Computer Systems, Mar. 21, 2007, 13 pages.

Arredondo, J.R., "Rackspace Cloud Databases and Container-based virtualization", Published on: Aug. 2012 Available at: http://c1776742.r42.cf0.rackcdn.com/downloads/pdfs/Rackspace-Cloud-Databases-and-Container-based-Virtualization.pdf.

Choudhari, et al., "Docker-Run, Ship and building Applications", In International Journal of Latest Trends in Engineering and Technology, vol. 6, Issue 2, Nov. 2015, pp. 346-352.

Felter, et al., "An Updated Performance Comparison of Virtual Machines and Linux Containers", Published on: Jul. 21, 2014 Available at: http://domino.research.ibm.com/library/cyberdig.nsf/papers/0929052195DD819C85257D2300681E7B/$File/rc25482.pdf.

International Search Report and the Written Opinion of the International Searching Authority, issued to PCT Application No. PCT/US2017/022227, dated May 29, 2017, 13 pages.

* cited by examiner

OPERATING SYSTEM LAYERING

BACKGROUND

The use of virtualized servers has enabled a rapid growth in sharing processing resources and data for on-demand software services. For example, virtualized servers can be used to process data from users and enterprises in third party data centers. In some examples, the virtualized servers can be executed by a kernel of a host operating system that enables multiple isolated instances of software containers (also referred to herein as containers). The software containers can include any suitable operating system and any number of applications. Accordingly, a host server can implement any suitable number of software containers that include isolated user-space instances of virtualized servers with an operating system and corresponding applications.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

An embodiment provides a system for operating system layering comprising a memory device comprising a host operating system and one or more container runtime environments that execute a container operating system, the memory device further comprising one or more container temporary storage spaces. The system can also include a processor to manage, via a container facility, the one or more container temporary storage spaces and the one or more container runtime environments. Additionally, the processor can load, via the container facility, one or more drivers to provide compatibility between the container operating system and the host operating system. In some embodiments, the one or more drivers can include application program interface (API) compatibility libraries to enable API compatibility between the container operating system and the host operating system, metadata arbitration logic to enable compatibility between the container operating system and the host operating system by modifying container operating system references, and file arbitration logic to modify operating system file locations accessed by the container operating system and the host operating system.

In another embodiment, a method for operating system layering can include managing one or more container temporary storage spaces and one or more container runtime environments. The method can also include loading one or more drivers to provide compatibility between a container operating system and a host operating system. In some embodiments, the one or more drivers can include application program interface (API) compatibility libraries to enable API compatibility between the container operating system and the host operating system, metadata arbitration logic to enable compatibility between the container operating system and the host operating system by modifying container operating system references, and file arbitration logic to modify operating system file locations accessed by the container operating system and the host operating system.

In yet another embodiment, one or more computer-readable storage devices for operating system layering can include a plurality of instructions that, based at least on execution by a processor, cause the processor to manage, via a container facility, one or more container temporary storage spaces and one or more container runtime environments. The plurality of instructions can also cause the processor to load, via the container facility, one or more drivers to provide compatibility between a container operating system and a host operating system. In some embodiments, the one or more drivers can include application program interface (API) compatibility libraries to enable API compatibility between the container operating system and the host operating system, metadata arbitration logic to enable compatibility between the container operating system and the host operating system by modifying container operating system references, and file arbitration logic to modify operating system file locations accessed by the container operating system and the host operating system.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
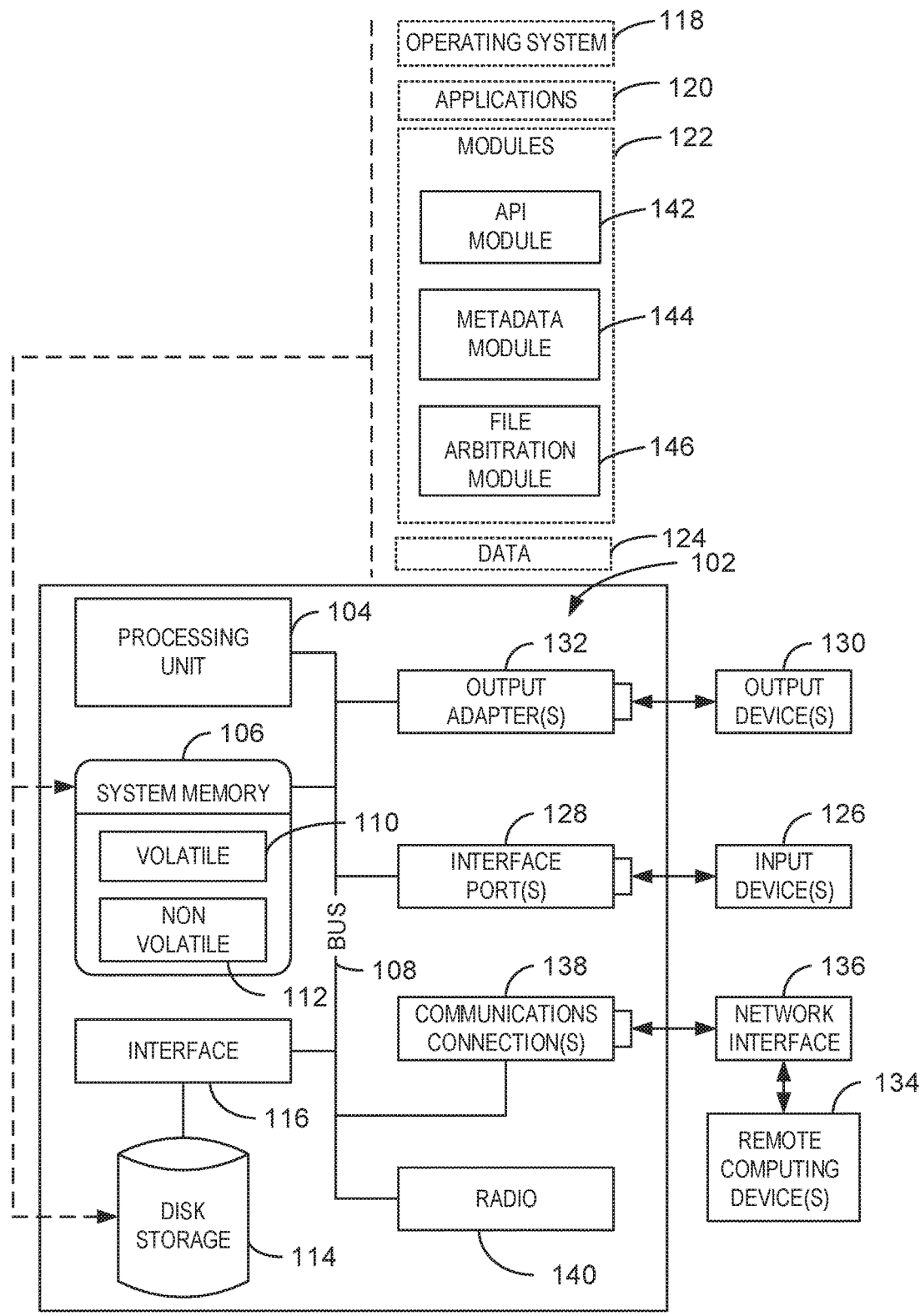
FIG. 1 is a block diagram of an example of a computing system that can implement operating system layering.

Operating systems have previously utilized various resource partitioning techniques to enable a higher density of server deployments. However, container-based virtualization offers higher compatibility between applications and virtualized servers, as well as an increased density, enabling more virtualized servers to simultaneously run on each host server. Therefore, container-based virtualization can lower costs of software development and increase revenue for the same facilities and hardware.

In some embodiments, container-based virtualization can depend on namespace isolation. Namespace isolation, as referred to herein, enables an application being executed in a container to view the application's environment as an isolated operating system entity. This improves compatibility between the application and its runtime environment. However, many operating system services, device drivers, and files for a container are actually shared with the host operating system. The sharing of resources achieves a higher density of container instances than an equivalent deployment of virtual machines. The subset of services and settings that correspond to a container instance are layered over the host operating system. The files and configuration settings corresponding to a container are stored in a temporary location using copy on write techniques, which enables an application or service running in a container to access a composition of host elements and container-specific elements that coalesce to construct the runtime environment.

While namespace isolation enables higher container densities in a host server, layering of container-specific elements over the host operating system includes many assumptions about compatibility and availability of host resources. For example, a container may be built from an operating system that is used for mobile phones, and the host may be a server-based operating system that is used to host many containers and server applications. Therefore, an application running in the container for mobile devices may encounter missing or incompatible application program interfaces (APIs) or environmental incompatibilities, among others.

The techniques described herein enable a host operating system to implement operating system layering. Operating system layering, as referred to herein, is a technique implemented by a host operating system or host device to enable any suitable number of nested software containers to execute applications. To enable operating system layering, techniques described herein resolve missing or incompatible APIs, and resolve any environmental incompatibilities. For example, environmental incompatibilities can include file locations or file names, device drivers, configuration policies, and installed features, among others. The techniques described herein enable a mapping between API function calls from a container to a host operating system. Similarly, techniques described herein enable mapping environmental data of a container to environmental data of a host operating system. The mapping enables a container to implement any suitable operating system regardless of the type or version of the host operating system. For example, the container operating system may include any version of Windows®, Linux®, any Apple® operating system, any Google® operating system, or any Amazon® operating system, among others and the host operating system may include a different operating system.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component. FIG. 1 discussed below, provide details regarding different systems that may be used to implement the functions shown in the figures.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computer systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, terms "component," "system," "client" and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable device, or media.

Computer-readable storage media can include but are not limited to magnetic storage devices (e.g., hard disk, floppy disk, and magnetic strips, among others), optical disks (e.g., compact disk (CD), and digital versatile disk (DVD), among others), smart cards, and flash memory devices (e.g., card, stick, and key drive, among others). In contrast, computer-readable media generally (i.e., not storage media) may additionally include communication media such as transmission media for wireless signals and the like.

FIG. 1 is a block diagram of an example of a computing system that can implement operating system layering. The example system 100 includes a computing device 102. The computing device 102 includes a processing unit 104, a system memory 106, and a system bus 108. In some examples, the computing device 102 can be a gaming console, a personal computer (PC), an accessory console, a gaming controller, among other computing devices. In some examples, the computing device 102 can be a node in a cloud network.

The system bus 108 couples system components including, but not limited to, the system memory 106 to the processing unit 104. The processing unit 104 can be any of various available processors. Dual microprocessors and other multiprocessor architectures also can be employed as the processing unit 104.

The system bus 108 can be any of several types of bus structure, including the memory bus or memory controller, a peripheral bus or external bus, and a local bus using any variety of available bus architectures known to those of ordinary skill in the art. The system memory 106 includes computer-readable storage media that includes volatile memory 110 and nonvolatile memory 112.

The basic input/output system (BIOS), containing the basic routines to transfer information between elements within the computer 102, such as during start-up, is stored in nonvolatile memory 112. By way of illustration, and not limitation, nonvolatile memory 112 can include read-only memory (ROM), programmable ROM (PROM), electrically programmable ROM (EPROM), electrically erasable programmable ROM (EEPROM), ReRAM (such as 3D XPoint), or flash memory.

Volatile memory 110 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink® DRAM (SLDRAM), Rambus® direct RAM (RDRAM), direct Rambus® dynamic RAM (DRDRAM), and Rambus® dynamic RAM (RDRAM).

The computer 102 also includes other computer-readable media, such as removable/non-removable, volatile/nonvolatile computer storage media. FIG. 1 shows, for example a disk storage 114. Disk storage 114 includes, but is not limited to, devices like a magnetic disk drive, floppy disk drive, tape drive, Jaz drive, Zip drive, LS-210 drive, flash memory card, or memory stick.

In addition, disk storage 114 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 114 to the system bus 108, a removable or non-removable interface is typically used such as interface 116.

It is to be appreciated that FIG. 1 describes software that acts as an intermediary between users and the basic computer resources described in the suitable operating environment 100. Such software includes an operating system 118. Operating system 118, which can be stored on disk storage 114, acts to control and allocate resources of the computer 102.

System applications 120 take advantage of the management of resources by operating system 118 through program modules 122 and program data 124 stored either in system memory 106 or on disk storage 114. It is to be appreciated that the disclosed subject matter can be implemented with various operating systems or combinations of operating systems.

A user enters commands or information into the computer 102 through input devices 126. Input devices 126 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 126 connect to the processing unit 104 through the system bus 108 via interface ports 128. Interface ports 128 include, for example, a serial port, a parallel port, a game port, and a universal serial bus (USB).

Output devices 130 use some of the same type of ports as input devices 126. Thus, for example, a USB port may be used to provide input to the computer 102 and to output information from computer 102 to an output device 130.

Output adapter 132 is provided to illustrate that there are some output devices 130 like monitors, speakers, and printers, among other output devices 130, which are accessible via adapters. The output adapters 132 include, by way of illustration and not limitation, video and sound cards that provide a means of connection between the output device 130 and the system bus 108. It can be noted that other devices and systems of devices provide both input and output capabilities such as remote computing devices 134.

The computer 102 can be a server hosting various software applications in a networked environment using logical connections to one or more remote computers, such as remote computing devices 134. The remote computing devices 134 may be client systems configured with web browsers, PC applications, mobile phone applications, and the like. The remote computing devices 134 can be a personal computer, a server, a router, a network PC, a workstation, a microprocessor based appliance, a mobile phone, a peer device or other common network node and the like, and typically includes many or all of the elements described relative to the computer 102.

Remote computing devices 134 can be logically connected to the computer 102 through a network interface 136 and then connected via a communication connection 138, which may be wireless. Network interface 136 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 138 refers to the hardware/software employed to connect the network interface 136 to the bus 108. While communication connection 138 is shown for illustrative clarity inside computer 102, it can also be external to the computer 102. The hardware/software for connection to the network interface 136 may include, for exemplary purposes, internal and external technologies such as, mobile phone switches, modems including regular telephone grade modems, cable modems and DSL modems, ISDN adapters, and Ethernet cards.

The computer 102 can further include a radio 140. For example, the radio 140 can be a wireless local area network radio that may operate one or more wireless bands. For example, the radio 140 can operate on the industrial, scientific, and medical (ISM) radio band at 2.4 GHz or 5 GHz. In some examples, the radio 140 can operate on any suitable radio band at any radio frequency.

The computer 102 includes one or more modules 122, such as an API module 142, a metadata module 144, and a file arbitration module 146, configured to enable implementing operating system layering. The API module 142, metadata module 144, and file arbitration module 146 refer to structural elements that perform associated functions. In some embodiments, the functionalities of the API module 142, metadata module 144, and file arbitration module 146 can be implemented with logic, wherein the logic, as referred to herein, can include any suitable hardware (e.g., a processor, among others), software (e.g., an application, among others), firmware, or any combination of hardware, software, and firmware. In some embodiments, the API module 142 can create an API mapping table or any other suitable data structure, which can include any suitable number of pairs of corresponding API functions in a container and a host operating system. For example, the API mapping table can indicate API host file names that include the same function or functionality. In some embodiments, the API mapping table can indicate a relationship between any number of API host file names for any number of operating system types and operating system versions such as any version of Windows®, Linux®, any Apple® operating system, any Google® operating system, or any Amazon® operating system, among others. For example, the API mapping table can indicate a first API host file name for a version of Linux® and a second API host file name for a version of Windows® that includes the same functions. In some embodiments, the API module 142 can also detect operating system information from a container and a host operating system. The API module 142 can use the operating system information to detect a mapping from the API mapping table. The API module 142 can modify an API function call if necessary based on the detected mapping from the API mapping table. In some embodiments, the API module 142, or any suitable driver, can implement the API mapping table, which maps an API to a compiled file for a specific operating system type.

In some embodiments, a metadata module 144 can modify operating system information stored as system metadata in locations such as but not limited to memory pages, page files, and the like. For example, system metadata can include metadata that indicates a type and/or version of an operating system being executed by a host or container. The system metadata can be accessed by processes and applications executed within a container. Therefore, the metadata module 144 can modify the information stored as system metadata to reflect the operating system information of the container rather than the operating system of the host operating system. By modifying or virtualizing the system metadata, the metadata module 144 can ensure that applications executed within a container will not generate unnecessary errors, exceptions, and the like.

In some embodiments, a file arbitration module 146 can modify configuration data corresponding to a container. For example, the container may implement an operating system with configuration data indicating locations of stored data, locations of operating system drivers, and the like. In some embodiments, configuration data accessed by applications in a container may correspond to the host operating system rather than the operating system of the container. The file arbitration module 146 can modify configuration data stored in the container to ensure that applications in the container access the correct information corresponding to the container rather than the host operating system. For example, the file arbitration module 146 can modify locations of drivers to be accessed by application executed within a container, modify locations of cached local data stored by applications executed within a container, and the like.

It is to be understood that the block diagram of FIG. 1 is not intended to indicate that the computing system 102 is to include all of the components shown in FIG. 1. Rather, the computing system 102 can include fewer or additional components not illustrated in FIG. 1 (e.g., additional applications, additional modules, additional memory devices, additional network interfaces, etc.). Furthermore, any of the functionalities of the API module 142, metadata module 144, and file arbitration module 146 may be partially, or entirely, implemented in hardware and/or in the processor 104. For example, the functionality may be implemented with an application specific integrated circuit, in logic implemented in the processor 104, or in any other device.

Figure 2:
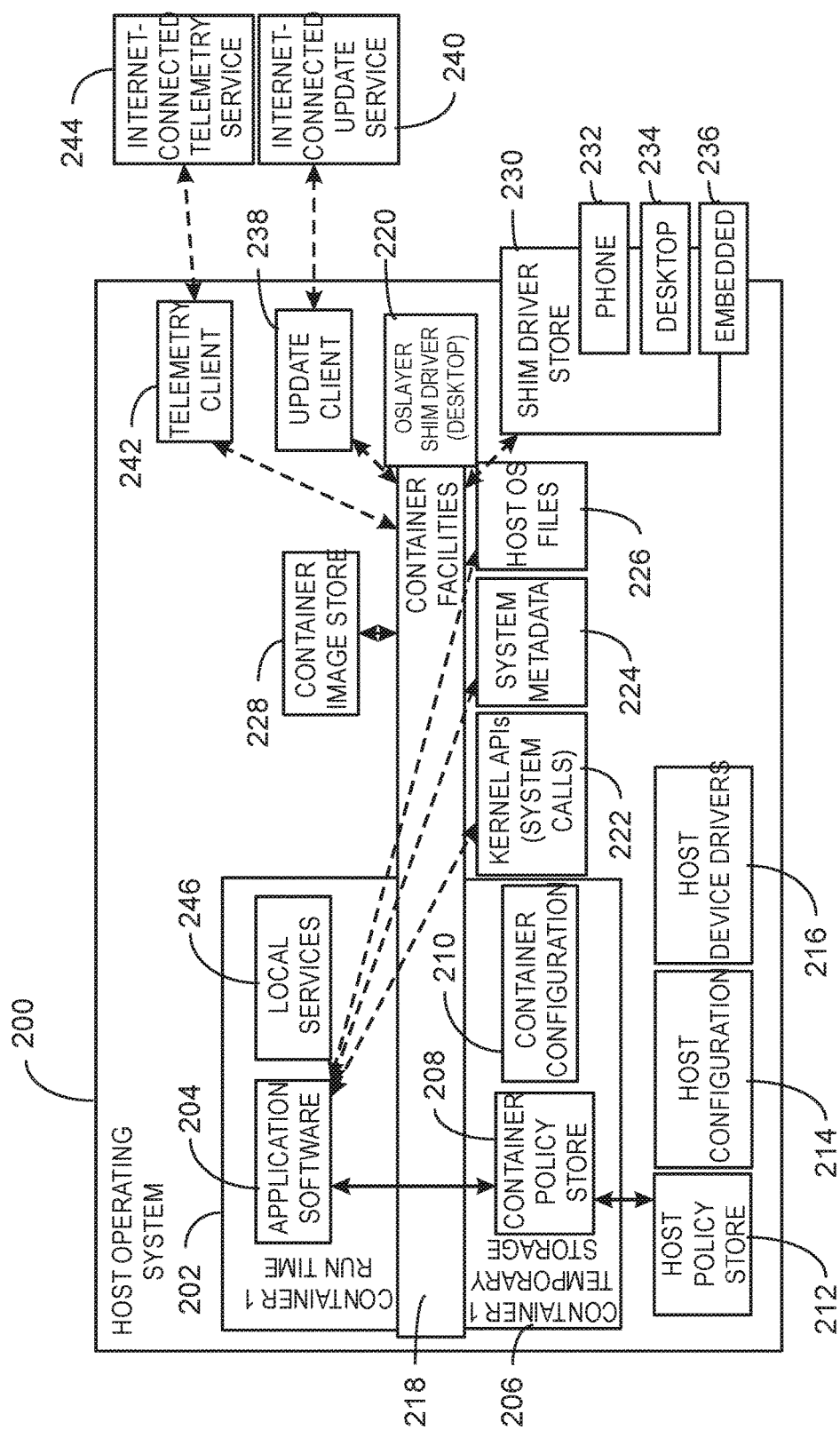
FIG. 2 is a block diagram illustrating a host operating system that can implement operating system layering.

FIG. 2 is a block diagram illustrating a host operating system that can implement API compatibility. The host operating system 200 can be implemented by any suitable computing device, such as the computing system 102 of FIG. 1.

In some embodiments, the container 1 runtime 202 can include any suitable number of applications and operating system services. The container 1 runtime 202 can be implemented with any suitable namespace isolation technique to manage the resources that are available to the applications and services of container 1. For example, the container 1 runtime 202 can include allocated CPU and memory resources from a host system that includes the host operating system 200. In some embodiments, the container 1 runtime 202 can include application software 204 that accesses container 1 temporary storage 206. The container 1 temporary storage 206 can include a container policy store 208 and container configuration data 210. The container policy store 208 can indicate policies regarding data access, user access roles, and the like. In some embodiments, the container policy store 208 can communicate the container policies to the host policy store 212, which includes global policies for the host operating system 200. In some embodiments, the policies can indicate an update service to provide drivers, descriptions of supported container operating systems, and the like.

In some embodiments, the container configuration data 210 of the container 1 temporary storage 206 can indicate configuration settings for the container 1 runtime 202. For example, the container configuration data 210 can indicate file paths for storage of drivers, file paths for storing cached container data, and the like. In some embodiments, the container configuration data 210 can differ from the host configuration data 214, which is stored in the host operating system 200 and reflects global configuration settings for the host operating system 200. In some embodiments, the host operating system 200 can also include any suitable number of host device drivers 216, which enable the host operating system 200 to communicate with any number of physical hardware devices.

In some embodiments, application software 204 in the container 1 runtime 202 can execute system calls. In some examples, the system calls can be modified by any number of drivers in the container facilities 218. In some embodiments, the container facilities 218 can include an OSLayer Shim Driver (also referred to herein as a shim driver) 220 that can modify attempts of the application software 204 to access the kernel APIs 222, system metadata 224, and host operating system files 226. For example, the shim driver 220 can use an API mapping table to map system calls from application software 204 to corresponding kernel APIs 222. The shim driver 220 can also detect when application software 204 accesses system metadata 224 of the host operating system 200 and modify the system metadata 224 to reflect the operating environment of the container 1 runtime 202. For example, the shim driver 220 can modify operating system information, such as operating system type and operating system version, stored in the system metadata 224 to reflect the operating system type and version of the container 1 runtime 202. In some embodiments, the shim driver 220 can also modify an attempt by the application software 204 to access the host operating system files 226. For example, the shim driver 220 can modify the locations at which the application software 204 searches for driver files, and the like.

In some embodiments, the shim driver 220 can also inspect an image from the container image store 228 to identify which type and/or version of an operating system is being executed in a container before the container is initialized. A container image store 228, as referred to herein, is a portion of memory that can store any suitable number of software applications associated with a particular container. The shim driver 220 can also determine a minimal compatibility mode of a container, which indicates a minimal set of runtime requirements for a container. Additionally, the shim driver 220 can also ensure the correct policy and configuration data are stored in the container 1 temporary storage 206. For example, the shim driver 220 can verify that the container configuration data 210 includes accurate CPU information, memory information, filesystem information, and I/O information that reflect the isolated namespace of the container 1 runtime 202 environment.

In some embodiments, the host operating system 200 can update the shim driver 220 from a shim driver store 230, which can include shim drivers for phones 232, shim driver for desktop 234, and shim drivers for embedded environments 236. The host operating system 200 can also update the shim driver 220 from an update client 238 module connected to an internet update service 240. Updating the shim driver 220 is described in further detail below in relation to FIG. 4.

In some embodiments, the shim driver 220 can also provide telemetry data about system calls and parameters that are processed by the application software 204 of the container 1 runtime 202. The telemetry data can indicate the mode of the container 1 runtime 202, wherein the mode can include full compatibility, minimal compatibility mode, and a mode in which container 1 does not have a driver. The telemetry data can indicate failed system API calls and return the telemetry data to the telemetry client 242 and to the internet connected telemetry service 244.

It is to be understood that the block diagram of FIG. 2 is not intended to indicate that the host operating system 200 is to include all of the components shown in FIG. 2. Rather, the host operating system 200 can include fewer or additional components not illustrated in FIG. 2. For example, the container 1 runtime 202 can also include local services 246 that can include any suitable application that is executed in the background of the container 1 runtime 202 and provides core operating system features such as web serving, file serving, printing, and error reporting, among others.

Figure 3:
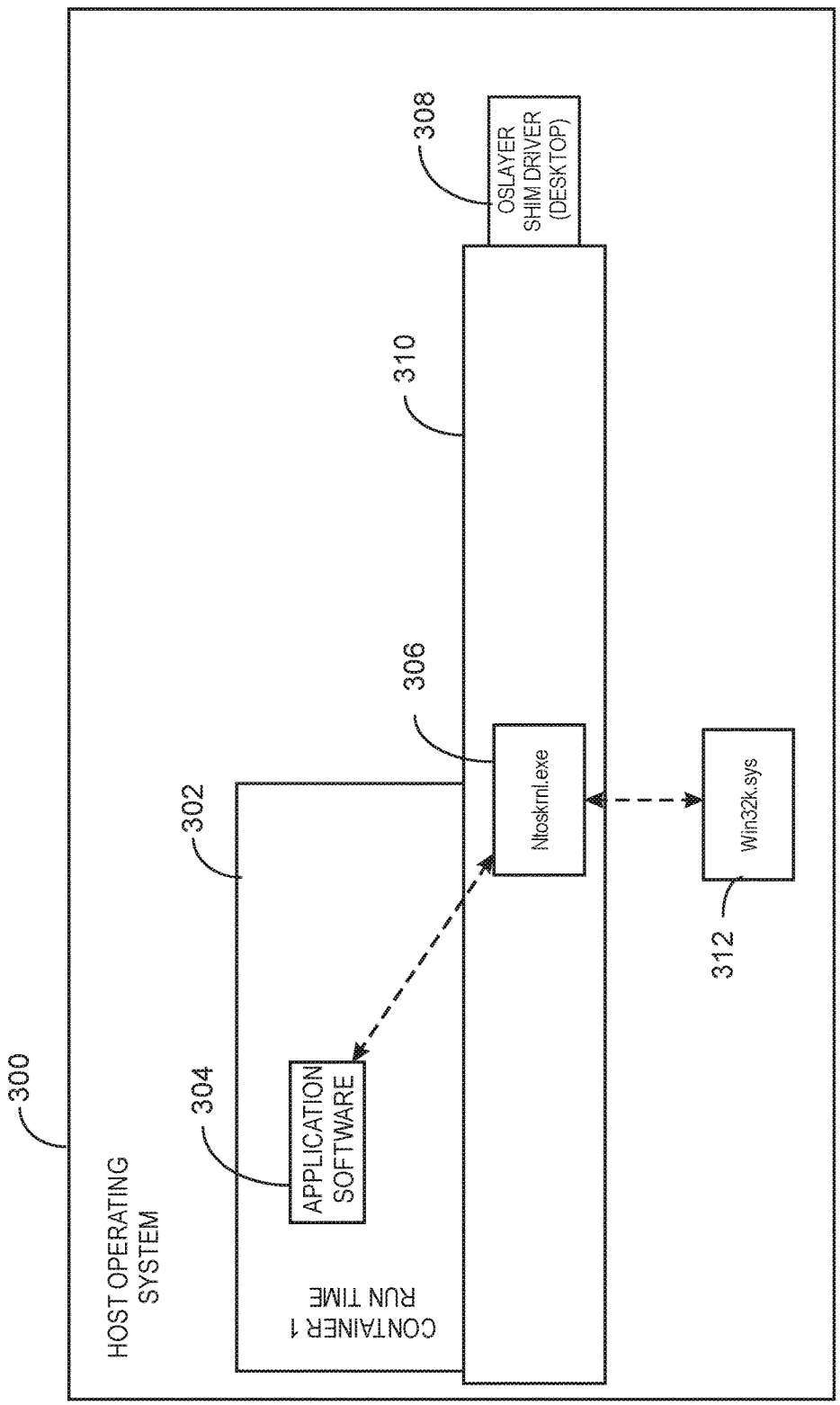
FIG. 3 is a block diagram illustrating a host operating system that can implement API compatibility.

FIG. 3 is a block diagram illustrating a host operating system that can implement API compatibility. The host operating system 300 can be implemented with any suitable computing device such as the computing system 102 of FIG. 1.

In some embodiments, the host operating system 300 can include a container 1 runtime 302, which can include application software 304. The application software 304 can execute any number of system calls to various hardware devices. In some embodiments, a system call from the application software 304 to the Ntoskrnl.exe file 306 is transmitted to the OSLayer Shim Driver 308 of the container facilities 310. In some embodiments, the container facilities 310 can include an API mapping table that the OSLayer Shim driver 308 creates during initialization of the container 1 runtime 302. The OSLayer Shim Driver 308 can use the API mapping table along with operating system information of the container 1 runtime 302 to determine a mapping for the system call. For example, the OSLayer Shim Driver 308 can change or modify the system call to a function and file name corresponding to the host operating system 300. The OSLayer Shim Driver 308 can transmit the modified system call to a Win32k.sys file 312 or to a corresponding kernel driver of another operating system such as Linux®, a Google® operating system, an Amazon® operating system, or an Apple® operating system, among others. The OSLayer Shim Driver 308 can monitor the return value from the Win32k.sys file 312 and modify the returned value if necessary before transmitting the returned value to the application software 304.

It is to be understood that the block diagram of FIG. 3 is not intended to indicate that the host operating system 300 is to include all of the components shown in FIG. 3. Rather, the host operating system 300 can include fewer or additional components not illustrated in FIG. 3. Furthermore, the host operating system 300 can include alternative components. For example, the host operating system 300 can include any suitable operating system such as a version of Windows®, Linux®, any Apple® operating system, any Google® operating system, or any Amazon® operating system, among others. By contrast, the container 1 runtime 302 can include a different operating system than the host operating system 300. In some examples, the container 1 runtime 302 can implement a version of Linux®, an Apple® operating system, any Google® operating system, or any Amazon® operating system, while the host operating system implements a version of Windows®.

Figure 4:
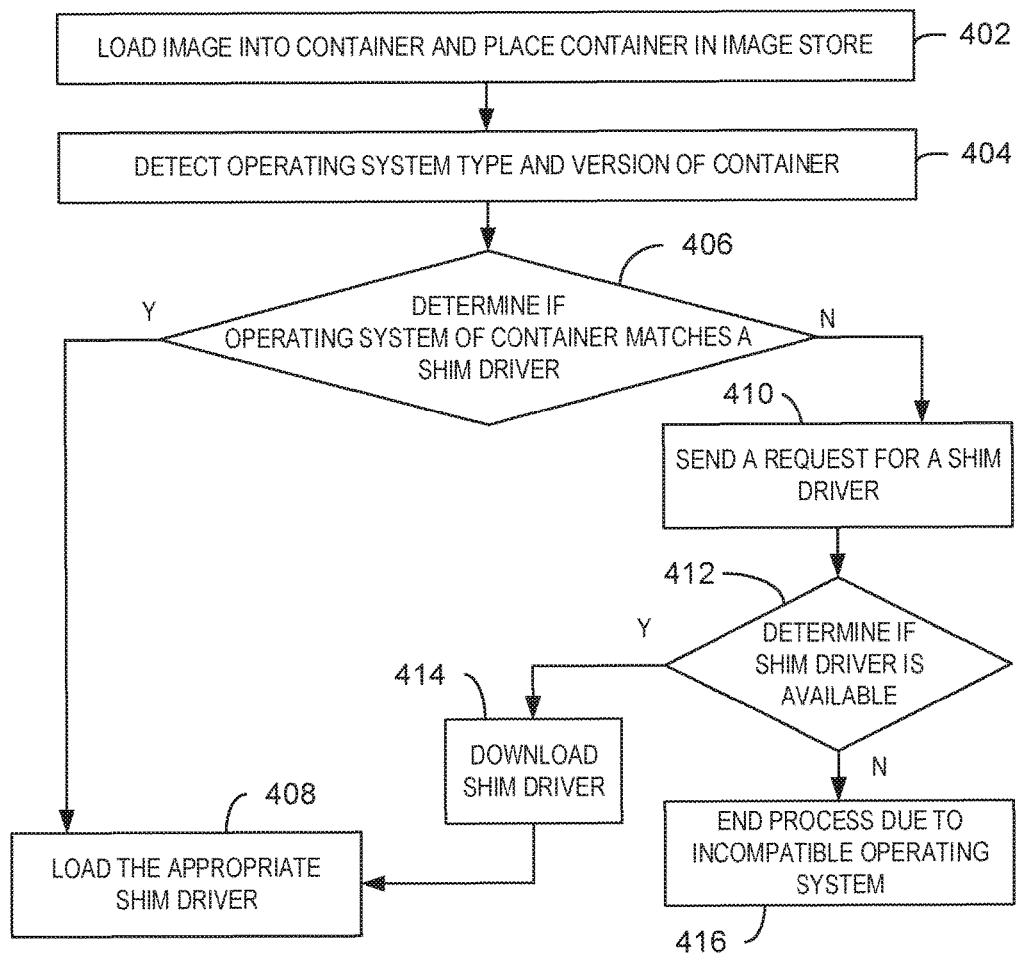
FIG. 4 is a process flow diagram of an example method for retrieving a driver that can implement operating system layering.

FIG. 4 is a process flow diagram of an example method for retrieving a driver that can implement operating system layering. The method 400 can be implemented with any suitable computing device, such as the computing system 102 of FIG. 1.

At block 402, an image loaded into a container can be placed in an image store. An image store, as referred to herein, can include any memory repository that can store any suitable number of images. An image, as referred to herein, can include any operating system software, driver package, and/or software application that can be loaded into a container. As discussed above, a container can include any suitable operating system.

In some embodiments, each image in the image store can include metadata that indicates a version, type, or date, among others. The metadata corresponding to each image can be used by the container facilities 206 to identify the image. In some examples, the container facilities 206 can mix and match images to maximize compatibility at runtime. These matched images may be monitored for compatibility and this monitoring information may be stored for future reference. In some embodiments, the container facilities 206 can calculate which images to load based on one or more of the following inputs including monitoring information, policy information, configuration information, or information stored with each image. The container facilities may also inspect the images for duplicate binary information and notify the host OS to de-duplicate these, reducing the memory footprint at runtime.

At block 404, the container facilities 206 can detect the version and type of the operating system image for the container in the image store. For example, the container facilities 206 can detect the operating system corresponding to a container that includes images of software applications.

At block 406, the container facilities 206 can determine if an operating system version and type for a container matches a shim driver, such as shim driver 220. If the container facilities 206 determine that a shim driver matches the operating system version and type for a container, the process continues at block 408. At block 408, the container facilities 206 load the appropriate shim driver to enable a container to execute images or software applications with a host operating system. If the container facilities 206 determine that there is not a shim driver that matches the operating system version and type for a container, the process continues at block 410.

At block 410, the container facilities 206 can send a request to an update client to determine if a shim driver is available that matches the operating version and type of a container. If the container facilities 206 determine at block 412 that a shim driver is available, the process continues at block 414. At block 414, the container facilities 206 can download the shim driver that matches an operating system version and type for a container and continue at block 408. If the container facilities 206 determine at block 412 that a shim driver is not available, the process ends at block 416 because the operating system version and type of the container is incompatible with shim drivers available to the container facilities 206.

In one embodiment, the process flow diagram of FIG. 4 is intended to indicate that the steps of the method 400 are to be executed in a particular order. Alternatively, in other embodiments, the steps of the method 400 can be executed in any suitable order and any suitable number of the steps of the method 400 can be included. Further, any number of additional steps may be included within the method 400, depending on the specific application. In some embodiments, a container facility can identify the shim driver based on a comparison of drivers stored in a local driver store, drivers available for download from an update service, or drivers acquired from an image file. For example, the container facility can determine a container operating system version or a container operating system type and determine a host operating system version or a host operating system type and detect that a shim driver enables a container with a container operating system to execute system calls with the host operating system. In some embodiments, a container facility can determine that one or more drivers are not stored in a memory device and download an updated driver or load the updated driver that is embedded in an image file. For example, a container can include any number of software applications or images along with drivers used to execute the software applications. In some embodiments, container facilities can inspect downloaded images for duplicate binaries, and notify a host operating system to "de-duplicate" the duplicate binaries to reduce a footprint of the downloaded images at runtime.

Figure 5:
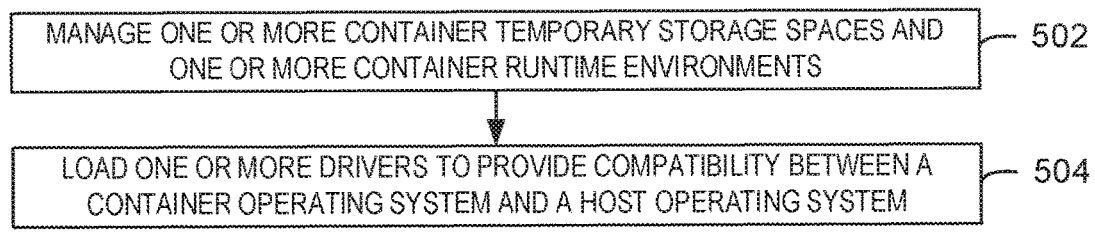
FIG. 5 is a process flow diagram of an example method for implementing operating system layering.

FIG. 5 is a process flow diagram of an example method for implementing operating system layering. The method 500 can be implemented with any suitable computing device, such as the computing system 102 of FIG. 1.

At block 502, a container facility can manage one or more container temporary storage spaces and one or more container runtime environments. For example, the container facility can load or delete any number of container temporary storage spaces that correspond to containers. In some embodiments, the container facility can also reserve memory for a container runtime environment in response to loading a container. Alternatively, the container facility can delete and deallocate memory reserved for a container runtime environment in response to the deletion or removal of a container.

At block 504, the container facility can load one or more drivers to provide compatibility between a container operating system and a host operating system. In some embodiments, the one or more drivers to be loaded can include API compatibility libraries to ensure API compatibility between the container operating system and the host operating system. For example, as discussed above, the API compatibility libraries can include an API mapping table that maps system calls from application software in a container to corresponding kernel APIs in a host operating system. In some embodiments, the API compatibility libraries can use any suitable data structure rather than an API mapping table. For example, the API compatibility libraries can include a linked list, an array, or a vector, among others. The one or more drivers can also include operating system metadata arbitration logic to enable compatibility between the container operating system and the host operating system by modifying container operating system references. A container operating system reference, as referred to herein, can include system metadata, and the like. For example, the one or more drivers can detect when application software in a container accesses system metadata of a host operating system and modify the system metadata to reflect the operating environment of the container. In some examples, the drivers can also modify operating system information, such as operating system type and operating system version, stored in the system metadata to reflect the operating system type and version of a container.

In some embodiments, the drivers can also include operating system file arbitration logic to modify operating system file locations accessed by the container operating system and the host operating system. For example, the drivers can modify the locations at which the application software in a container searches for driver files, and the like.

In one embodiment, the process flow diagram of FIG. 5 is intended to indicate that the steps of the method 500 are to be executed in a particular order. Alternatively, in other embodiments, the steps of the method 500 can be executed in any suitable order and any suitable number of the steps of the method 500 can be included. Further, any number of additional steps may be included within the method 500, depending on the specific application. In some embodiments, a container facility can be executed remotely as a distributed service. For example, a container facility can remotely manage a container and provide drivers to enable a container to execute software applications or images with a host operating system. In some embodiments, a container facility can load drivers and use data in the drivers to execute a system call. In some examples, the container facility can detect a failed execution of a system call from the container operating system and return a compatible exception and/or event. Alternatively, the container facility can detect a successful execution of the system call from the container operating system and return a compatible response. A compatible response, as referred to herein, can include any value that the operating system of a container recognizes as a valid response to a system call.

Figure 6:
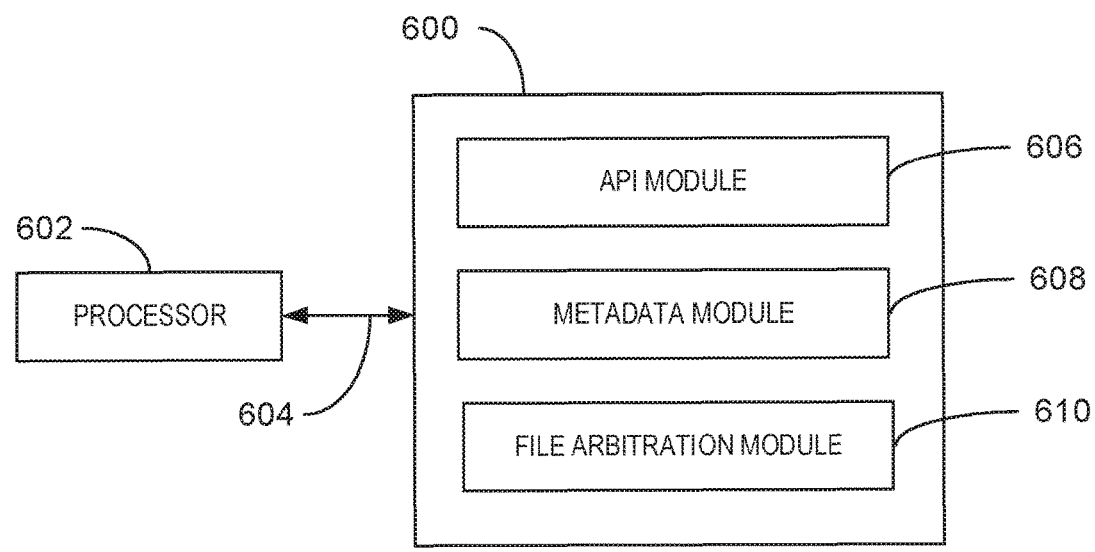
FIG. 6 is a block diagram of an example computer-readable storage media that can implement operating system layering.

FIG. 6 is a block diagram of an example computer-readable storage media that can implement operating system layering. The tangible, computer-readable storage media 600 may be accessed by a processor 602 over a computer bus 604. Furthermore, the tangible, computer-readable storage media 600 may include code to direct the processor 602 to perform the steps of the current method.

The various software components discussed herein may be stored on the tangible, computer-readable storage media 600, as indicated in FIG. 6. For example, the tangible computer-readable storage media 600 can include an API module 606, a metadata module 608, and a file arbitration module 610. In some embodiments, the API module 606 can create an API mapping table, which can include any suitable number of pairs of corresponding API functions in a container and a host operating system. For example, the API mapping table can indicate API host file names that include the same function or functionality. In some embodiments, the API mapping table can indicate a relationship between any number of API host file names for any number of operating system types and operating system versions.

In some embodiments, a metadata module 608 can modify operating system information stored in system metadata. For example, the system metadata can include information that indicates a type and/or version of operating system being executed. The system metadata can be accessed by processes and applications executed within a container. Therefore, the metadata module 608 can modify the information stored as system metadata to reflect the operating system information of the container rather than the operating system of the host operating system. By modifying or virtualizing the system metadata, the metadata module 608 can ensure that applications executed within a container will not generate unnecessary errors, exceptions, and the like.

In some embodiments, a file arbitration module 610 can modify configuration data corresponding to a container. For example, the container may implement an operating system with configuration data indicating locations of stored data, locations of operating system drivers, and the like. In some embodiments, configuration data accessed by applications in a container may correspond to the host operating system rather than the operating system of the container. The file arbitration module 610 can modify configuration data stored in the container to ensure that applications in the container access the correct information corresponding to the container rather than the host operating system.

It is to be understood that any number of additional software components not shown in FIG. 6 may be included within the tangible, computer-readable storage media 600, depending on the specific application.

Example 1

In one example, a system for operating system layering can include a memory device comprising a host operating system and one or more container runtime environments that execute a container operating system, the memory device further comprising one or more container temporary storage spaces. The system can also include a processor to manage, via a container facility, the one or more container temporary storage spaces and the one or more container runtime environments. Additionally, the processor can load, via the container facility, one or more drivers to provide compatibility between the container operating system and the host operating system. In some embodiments, the one or more drivers can include application program interface (API) compatibility libraries to enable API compatibility between the container operating system and the host operating system, metadata arbitration logic to enable compatibility between the container operating system and the host operating system by modifying container operating system references, and file arbitration logic to modify operating system file locations accessed by the container operating system and the host operating system.

Alternatively, or in addition, the processor can identify the one or more drivers based on a comparison of drivers stored in a local driver store, drivers available for download from an update service, or drivers acquired from an image file. Alternatively, or in addition, the comparison can include determining a container operating system version or a container operating system type and determining a host operating system version or a host operating system type. Alternatively, or in addition, the one or more drivers can implement a data structure that maps an API to a compiled file for a specific operating system type. Alternatively, or in addition, the processor can load the one or more drivers and use data in the one or more drivers to execute a system call. Alternatively, or in addition, the processor can detect a failed execution of the system call from the container operating system and return a compatible exception and/or event. Alternatively, or in addition, the processor can detect a successful execution of the system call from the container operating system and return a compatible response. Alternatively, or in addition, the processor can monitor failed system calls and collect telemetry data. Alternatively, or in addition, the processor can determine that the one or more drivers are not stored in the memory device and download an updated driver or load the updated driver that is embedded in the image file. Alternatively, or in addition, the processor can load the one or more drivers based on metadata corresponding to the host operating system, the container operating system, API compatibility libraries, driver packages, and application software. Alternatively, or in addition, the processor can load one or more image files based on monitoring information, policy information, configuration information, or information stored with each image file. Alternatively, or in addition, the processor can inspect one or more image files for duplicate binary information and notify the host operating system to de-duplicate the one or more image files with duplicate binary information.

Example 2

In another embodiment, a method for operating system layering can include managing one or more container temporary storage spaces and one or more container runtime environments. The method can also include loading one or more drivers to provide compatibility between a container operating system and a host operating system. In some embodiments, the one or more drivers can include application program interface (API) compatibility libraries to enable API compatibility between the container operating system and the host operating system, metadata arbitration logic to enable compatibility between the container operating system and the host operating system by modifying container operating system references, and file arbitration logic to modify operating system file locations accessed by the container operating system and the host operating system.

Alternatively, or in addition, the method can include identifying the one or more drivers based on a comparison of drivers stored in a local driver store, drivers available for download from an update service, or drivers acquired from an image file. Alternatively, or in addition, the comparison can include determining a container operating system version or a container operating system type and determining a host operating system version or a host operating system type. Alternatively, or in addition, the one or more drivers can implement a data structure that maps an API to a compiled file for a specific operating system type. Alternatively, or in addition, the method can include loading the one or more drivers and using data in the one or more drivers to execute a system call. Alternatively, or in addition, the method can include detecting a failed execution of the system call from the container operating system and returning a compatible exception and/or event. Alternatively, or in addition, the method can include detecting a successful execution of the system call from the container operating system and returning a compatible response. Alternatively, or in addition, the method can include monitoring failed system calls and collecting telemetry data. Alternatively, or in addition, the method can include determining that the one or more drivers are not stored in the memory device and downloading an updated driver or load the updated driver that is embedded in the image file. Alternatively, or in addition, the method can include loading the one or more drivers based on metadata corresponding to the host operating system, the container operating system, API compatibility libraries, driver packages, and application software. Alternatively, or in addition, the method can include loading one or more image files based on monitoring information, policy information, configuration information, or information stored with each image file. Alternatively, or in addition, the method can include inspecting one or more image files for duplicate binary information and notifying the host operating system to de-duplicate the one or more image files with duplicate binary information.

Example 3

In yet another embodiment, one or more computer-readable storage devices for operating system layering can include a plurality of instructions that, based at least on execution by a processor, cause the processor to manage, via a container facility, one or more container temporary storage spaces and one or more container runtime environments. The plurality of instructions can also cause the processor to load, via the container facility, one or more drivers to provide compatibility between a container operating system and a host operating system. In some embodiments, the one or more drivers can include application program interface (API) compatibility libraries to enable API compatibility between the container operating system and the host operating system, metadata arbitration logic to enable compatibility between the container operating system and the host operating system by modifying container operating system references, and file arbitration logic to modify operating system file locations accessed by the container operating system and the host operating system.

Alternatively, or in addition, the plurality of instructions can also cause the processor to identify the one or more drivers based on a comparison of drivers stored in a local driver store, drivers available for download from an update service, or drivers acquired from an image file. Alternatively, or in addition, the comparison can include determining a container operating system version or a container operating system type and determining a host operating system version or a host operating system type. Alternatively, or in addition, the one or more drivers can implement a data structure that maps an API to a compiled file for a specific operating system type. Alternatively, or in addition, the plurality of instructions can also cause the processor to load the one or more drivers and use data in the one or more drivers to execute a system call. Alternatively, or in addition, the plurality of instructions can also cause the processor to detect a failed execution of the system call from the container operating system and return a compatible exception and/or event. Alternatively, or in addition, the plurality of instructions can also cause the processor to detect a successful execution of the system call from the container operating system and return a compatible response. Alternatively, or in addition, the plurality of instructions can also cause the processor to monitor failed system calls and collect telemetry data. Alternatively, or in addition, the plurality of instructions can also cause the processor to determine that the one or more drivers are not stored in the memory device and download an updated driver or load the updated driver that is embedded in the image file. Alternatively, or in addition, the plurality of instructions can cause the processor to load the one or more drivers based on metadata corresponding to the host operating system, the container operating system, API compatibility libraries, driver packages, and application software. Alternatively, or in addition, the plurality of instructions can cause the processor to load one or more image files based on monitoring information, policy information, configuration information, or information stored with each image file. Alternatively, or in addition, the plurality of instructions can cause the processor to inspect one or more image files for duplicate binary information and notify the host operating system to de-duplicate the one or more image files with duplicate binary information.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system to support operating system layering, comprising: a memory device comprising a host operating system and one or more container runtime environments that execute a container operating system, wherein the host operating system is a different operating system than the container operating system, the memory device further comprising one or more container temporary storage spaces; and a processor to: manage, via a container facility, the one or more container temporary storage spaces and the one or more container runtime environments; and load, via the container facility, one or more drivers to provide compatibility between the container operating system and the host operating system, wherein the processor is to identify the one or more drivers based on a comparison of drivers stored in a source selected from a group consisting of a local driver store, drivers available for download from an update service, and drivers acquired from an image file, and wherein the comparison comprises determining a container operating system version or a container operating system type and determining a host operating system version or a host operating system type, the one or more drivers comprising: application program interface (API) compatibility libraries to enable API compatibility between the container operating system and the host operating system, wherein the API compatibility libraries comprise a mapping table to map a system call executed by the container operating system to a kernel API in the host operating system, wherein the mapping table is to support the container operating system being different from the host operating system; metadata arbitration logic to enable compatibility between the container operating system and the host operating system by modifying container operating system references; and file arbitration logic to modify operating system file locations accessed by the container operating system and the host operating system.

2. The system of claim 1, wherein the one or more drivers implement a data structure that maps an API to a compiled file for a specific operating system type.

3. The system of claim 1, wherein the processor is to load the one or more drivers and use data in the one or more drivers to execute a system call.

4. The system of claim 3, wherein the processor is to detect a failed execution of the system call from the container operating system and return a compatible exception and/or event.

5. The system of claim 3, wherein the processor is to detect a successful execution of the system call from the container operating system and return a compatible response.

6. The system of claim 1, wherein the processor is to monitor failed system calls and collect telemetry data.

7. The system of claim 1, wherein the processor is to determine that the one or more drivers are not stored in the memory device; and download an updated driver or load the updated driver that is embedded in an image file.

8. The system of claim 1, wherein the processor is to load the one or more drivers based on metadata corresponding to the host operating system, the container operating system, API compatibility libraries, driver packages, and application software.

9. The system of claim 1, wherein the processor is to modify the system call to a function and a file name corresponding to the host operating system and transmit the modified system call to a kernel driver of the host operating system.

10. A method for operating system layering, comprising: managing one or more container temporary storage spaces and one or more container runtime environments; and loading, one or more drivers to provide compatibility between a container operating system and a host operating system, wherein the host operating system is a different operating system than the container operating system, wherein the one or more drivers are identified based on a comparison of drivers stored in a source selected from a group consisting of a local driver store, drivers available for download from an update service, and drivers acquired from an image file, and wherein the comparison comprises determining a container operating system version or a container operating system type and determining a host operating system version or a host operating system type, the one or more drivers comprising: application program interface (API) compatibility libraries to enable API compatibility between the container operating system and the host operating system, wherein the API compatibility libraries comprise a mapping table to map a system call executed by the container operating system to a kernel API in the host operating system, wherein the mapping table is to support the container operating system being different from the host operating system; metadata arbitration logic to enable compatibility between the container operating system and the host operating system by modifying container operating system references; and file arbitration logic to modify operating system file locations accessed by the container operating system and the host operating system.

11. The method of claim 10, wherein the one or more drivers implement a data structure that maps an API to a compiled file for a specific operating system type.

12. The method of claim 10, comprising loading the one or more drivers and use data in the one or more drivers to execute a system call.

13. The method of claim 12, comprising detecting a failed execution of the system call from the container operating system and return a compatible exception and/or event.

14. The method of claim 12, comprising detecting a successful execution of the system call from the container operating system and return a compatible response.

15. The method of claim 10, comprising loading the one or more drivers based on metadata corresponding to the host operating system, the container operating system, API compatibility libraries, driver packages, and application software.

16. The method of claim 10, comprising loading one or more image files based on monitoring information, policy information, configuration information, or information stored with each image file.

17. The method of claim 10, comprising inspecting one or more image files for duplicate binary information and notifying the host operating system to de-duplicate the one or more image files with duplicate binary information.

18. One or more computer-readable storage devices for operating system layering comprising a plurality of instructions that, based at least on execution by a processor, cause the processor to: manage, via a container facility, one or more container temporary storage spaces and one or more container runtime environments; and load, via the container facility, one or more drivers to provide compatibility between a container operating system and a host operating system, wherein the host operating system is a different operating system than the container operating system, wherein the processor is to identify the one or more drivers based on a comparison of drivers stored in a source selected from a group consisting of a local driver store, drivers available for download from an update service, and drivers acquired from an image file, and wherein the comparison comprises determining a container operating system version or a container operating system type and determining a host operating system version or a host operating system type, the one or more drivers comprising: application program interface (API) compatibility libraries to enable API compatibility between the container operating system and the host operating system, wherein the API compatibility libraries comprise a mapping table to map a system call executed by the container operating system to a kernel API in the host operating system, wherein the mapping table is to support the container operating system being different from the host operating system; metadata arbitration logic to enable compatibility between the container operating system and the host operating system by modifying container operating system references; and file arbitration logic to modify operating system file locations accessed by the container operating system and the host operating system.

19. The one or more computer-readable storage devices of claim 18, wherein the one or more drivers implement a data structure that maps an API to a compiled file for a specific operating system type.

* * * * *